United States Patent

[11] 3,632,197

[72] Inventor Thomas M. Shelton
        Glendale, Calif.
[21] Appl. No. 848,807
[22] Filed Aug. 11, 1969
[45] Patented Jan. 4, 1972
[73] Assignee North American Rockwell Corporation

[54] VIEWING METHOD AND MEANS
    2 Claims, 4 Drawing Figs.
[52] U.S. Cl................................................. 353/44,
                                                353/57, 355/18
[51] Int. Cl........................................G03b21/00,
                                                    G03b21/16
[50] Field of Search............................... 353/44;
                                                    355/18, 63

[56]            References Cited
            UNITED STATES PATENTS
1,416,154   5/1922  Ahbe............................. 353/44

2,053,073  9/1936  Gardner....................... 353/44
            FOREIGN PATENTS
36,062      1906  Switzerland.................. 353/44
715,483  11/1941  Germany...................... 353/44

Primary Examiner—Leonard Forman
Assistant Examiner—Steven L. Stephan
Attorney—L. Lee Humphries ABSTRACT: A microfilm projector is mounted over a draftsman's worktable by a fixed overhead support and adapted to receive microfilmed data such as technical reports. The projected and enlarged image of each separate page of data is cast onto the worktable surface at a location convenient for viewing, comparing, and/or copying by the draftsman.

INVENTOR
THOMAS M. SHELTON
BY
ATTORNEY

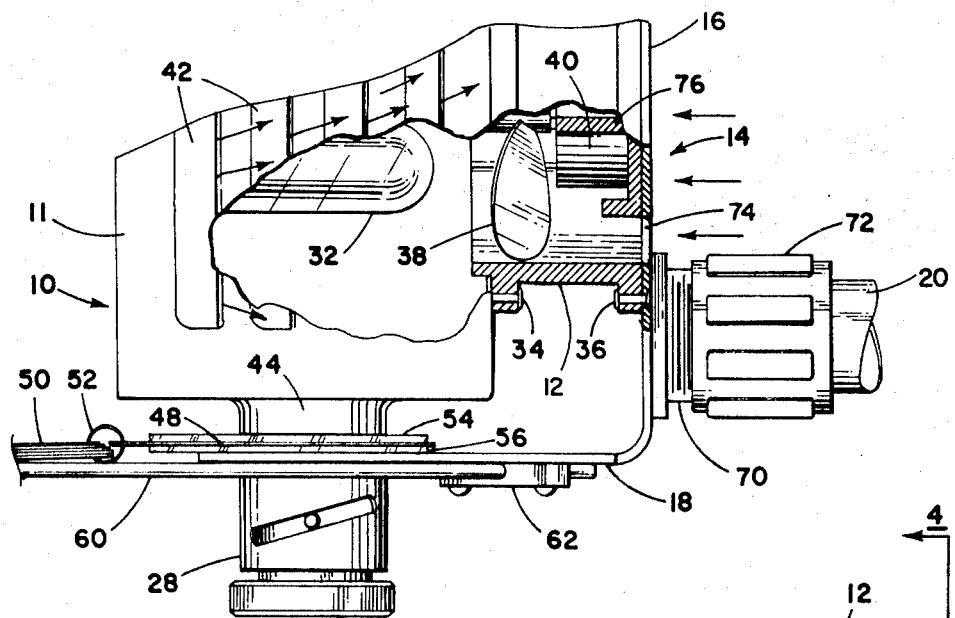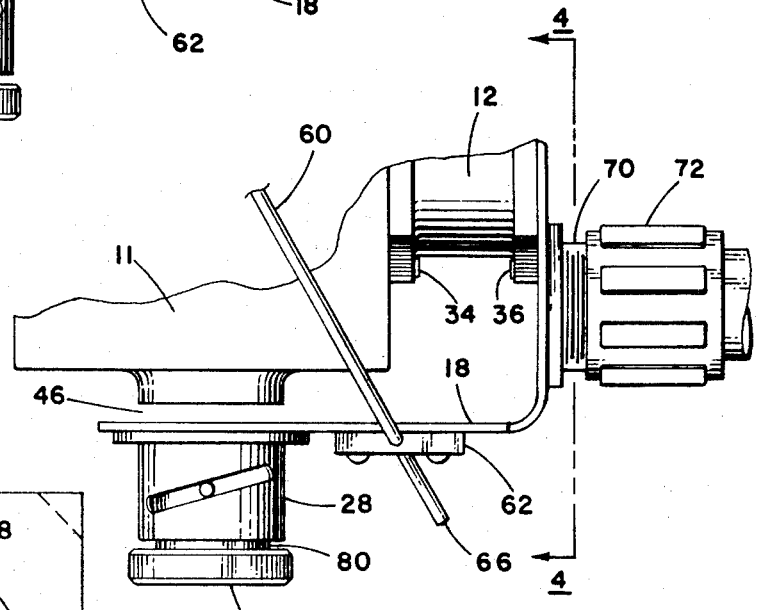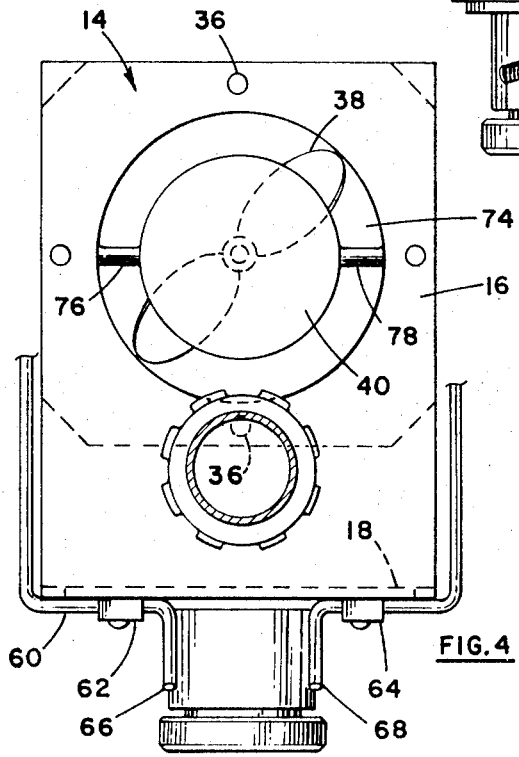

VIEWING METHOD AND MEANS

BACKGROUND OF THE INVENTION

The field of art to which this invention pertains involves optical image projectors such as used for projecting microfilmed data, and particularly to such devices wherein the projector and the surface which receives the projected image are structurally related.

In the prior art, various different optical and mechanical devices are used for viewing microfilmed data as a means for retrieval of such data. Many of these devices are complicated, expensive to manufacture and difficult to operate, and if portable, occupy a substantial portion of the total desktop area. Moreover, many such devices involve the provision of a special treated screen, either vertically or somewhat slanted from a vertical position and situated under a hood or other light barrier to reduce the interference resulting from ambient light surrounding the screen. Where data, information or graphs and drawings need to be studied, compared or copied in close coordination with other printed matter, use of bulky projectors on a worktable of limited size and area is often inconvenient. Where the viewing screen is vertically oriented and specially treated such as by metallic coatings or the like, copying of data from the projected image onto another sheet or surface is often totally impractical.

SUMMARY OF THE INVENTION

The invention in this case consists of a projector assembly 10 comprising a housing 11 containing a light source of very high intensity and cooled by a fan 38 mounted in a housing 12. The projector and fan are supported on a bracket 14 in fixed spatial relationship with a worktable 26 by means of tubular arm 20 mounted on table 26. A lens assembly 28 is supported on bracket 14 in spaced relationship with housing 11 to permit insertion of microfilm cards or strips in suitable alignment with the mentioned illumination source. Lens assembly 28 projects an enlarged image 30 directly on the surface of table 26 or upon a drawing sheet 84 supported on the table.

BRIEF DESCRIPTION OF THE DRAWINGS

FIG. 2 shows a side elevational view, partly broken away, of the projector, lens, and fan assembly shown in FIG. 1, FIG. 3 shows a side elevational view generally corresponding with FIG. 2 and of the same structure, and FIG. 4 shows an end elevational view of the bracket and fan assembly shown in FIGS. 2 and 3 as suggested by line 4—4 in FIG. 3.

DESCRIPTION OF THE PREFERRED EMBODIMENT

Figure 1:
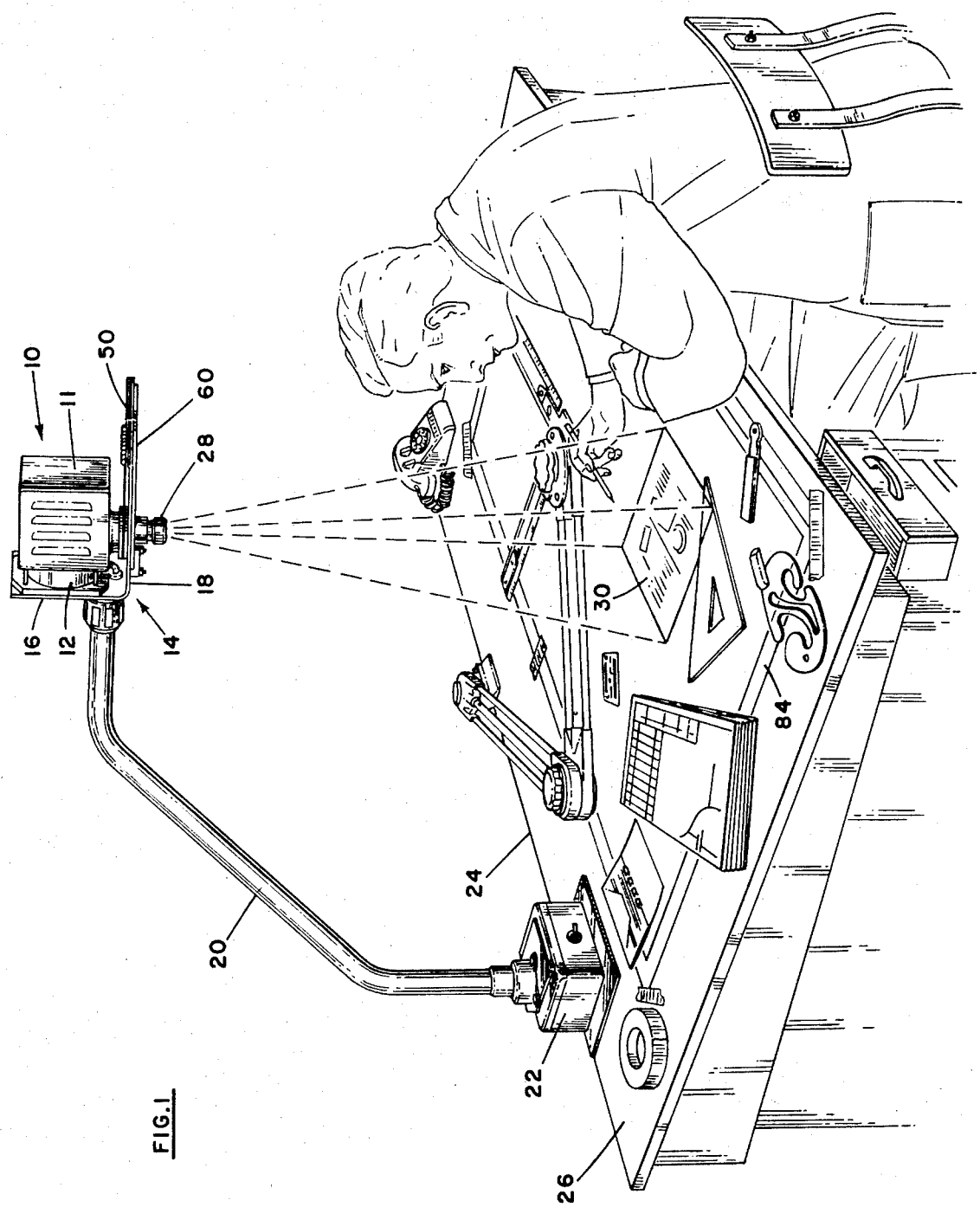
FIG. 1 shows a general perspective view of an illustrative embodiment of the inventive concept in this case.

Referring to FIG. 1, the invention in this case may be seen to include a relatively small, high-intensity projector generally designated by reference numeral 10 and comprising a suitable source of illumination within a housing 11 operatively associated with cooling means which may take the form of a fan contained within housing 12. Housing 11 and housing 12 are secured together by suitable structural means and are in turn attached to a bracket 14. Bracket 14 may conveniently be of thin rigid sheet metal having a generally L-shaped form with upstanding portion 16 and laterally extending portion 18. Elongate support means such as tube 20 secured at one end thereof to bracket 14 provide structural support for the projector assembly 10 and the mentioned components adjacent thereto. Tube 20 is supported on a suitable base member 22, preferably in pivotal relationship by a sleeve or bearing (not shown) which may take any convenient form known to the prior art. Base member 22 is clamped or otherwise affixed to an edge 24 of a desk top, workbench, draftsman's worktable or the like such as shown illustratively by table 26. Suitable focusing means such as adjustable lens assembly 28 are supported on lateral projecting portion 18 of bracket 14 for focusing an enlarged image on the top surface of table 26 as suggested by image 30.

Referring to FIG. 2, housing 11 may be seen to contain one or more sources of illumination such as suggested by lightbulb 32 having a high rating such as 500–600 watts. Housing 12 may be secured to housing 11 by any suitable connection means such as a plurality of rivets 34, and to upstanding bracket portion 16 by similar means such as rivets 36. Housing 12 contains cooling means which may illustratively comprise one or more propellers as shown by propeller 38 connected to drive means such as electric motor 40. Bracket portion 16 is provided with an opening or aperture 74 to permit surrounding air to be drawn into housing 11 by rotation of propeller 38, while housing 11 has one or more air outlets as suggested by louvered openings 42.

It may further be seen from FIG. 2 that housing 11 has a downwardly directed aperture 44 to provide a substantially vertical light path for the illumination provided by bulb 32. Aperture 44 is spaced a suitable distance above lateral portion 18 of bracket 14 to provide a gap 46 shown particularly in FIG. 3. Gap 46 permits insertion of microfilm plates, strips, or other photographic or printed indicia between aperture 44 and bracket portion 18 as shown by sheet 48 attached to microfiche booklet 50 by spiral binding 52 in FIG. 2. To minimize or eliminate any distortion in microfilm sheet 48 such as might otherwise result from heat generated by bulb 32, the microfilm sheet may conveniently be sandwiched between two small flat transparent plates such as suggested by glass plates 54 and 56 in FIG. 2. It may further be seen from FIG. 2 that lateral portion 18 of bracket 14 supports the sheet material which is intended to provide image 30 in proper vertical alignment with aperture 44. As further shown in FIGS. 2 and 3, additional support as may be required for booklets or sheets larger than the total area of lateral portion 18 is provided by wire loop 60 which is pivotally supported on portion 18 by two spaced-apart lugs or bosses 62 and 64, each having a hole therein through which the opposite ends 66 and 68 of loop 60 respectively extend as shown in FIG. 4, for example.

As seen more particularly from FIGS. 2 and 3, a hollow threaded pipe connection is affixed to bracket 14 in the manner suggested by threaded sleeve 70 and is adapted to transfer the weight of projector assembly 10 to support tube 20 through a rotatable bushing 72 adapted to engage the threads on fitting 70. Bushing 72 is rotatably mounted in load-transferring relationship on the upper distal end of tube 20. As further seen from FIG. 4, cooling air inlet opening 74 is provided in vertically extending portion 16 of bracket 14. Motor 49 also shown in FIG. 4 is supported within housing portion 12 by suitable means such as laterally extending webs 76 and 78 on either side of the motor.

As shown more particularly in FIG. 3, lens assembly 28 is supported on lateral extending portion 18 of bracket 14 and in substantial alignment vertically with aperture 44. Focal adjustment of lens 28 is accomplished by rotation of the inner telescoping portion 80 thereof by means of knurled ring 82 in a manner well known to the optical art.

From the foregoing, it may be seen that the invention in this case achieves results and advantages not provided heretofore, and particularly in connection with retrieval of information such as engineering reports, test data, specifications, design drawings, and the like which are modernly stored in microfilm form to reduce storage space and simplify indexing and retrieval. The structure thus disclosed is particularly useful for engineers and draftsmen who require frequent reference to filmed records during the preparation and use of drawings, reports and the like. Desk top viewers of the types in widespread current use interfere with planigraph drafting machines, T-squares, telephones, and other modern drafting and office equipment and intrude on working space. Such units known to the prior art also have inadequate illumination for satisfactory viewing under ambient light conditions normally existing in offices and drafting rooms, especially those illuminated by fluorescent lights. The structure disclosed herein provides maximum convenience to the user since the reference information and other indicia recorded on the microfilm is immediately accessible in the same plane as the work in progress as suggested by blueprint or drawing sheet 84 shown in FIG. 1. Projector 10 is supported at a sufficient height above table 26 to avoid interference with personnel working at the table, and leaves the entire work surface area free of obstructions. The swivel base connection between tube 20 and member 22 permits use of the same projector 10 on a plurality of closely situated desks or table such as many be adjacent to the side or front of table 26, whereby the same microfilm image may be duplicated by a plurality of separate draftsmen such as by tracing the enlarged image with pen or pencil onto portable sheet material, or conceivably printing such image on sensitized photographic paper of special self-developing type.

I claim:

1. Apparatus for projecting an enlarged image of microfilm on a worktable surface, comprising:
   a source of intense illumination,
   a housing over said source,
   aperture means in said housing including an opening for directing some of said intense illumination in a generally downward direction,
   a focusing means aligned with said opening and spaced apart therefrom,
   an angular bracket member having two angle portions with said housing attached to one of said leg portions of said bracket and said focusing means attached to the other of said leg portions of said bracket, said other leg portion being below and spaced apart form said housing aperture means and having an aperture for the transmission of illumination downwardly form said housing aperture means through said focusing means,
   support means comprising a member releasably pivotally connecting said bracket member to said worktable at the edge thereof and adapted to support said bracket member, housing and focusing in means in spaced relationship with and generally vertically above said worktable surface whereby said microfilm may be positioned on said other leg portion between sad housing aperture means and said focusing means to project an enlarge image directly on the worktable surface.

2. The aperture set forth in claim 1 above, further including:
   cooling fan means secured to said housing for circulating cooling air through said housing.

* * * * *